United States Patent
Mowry

(10) Patent No.: US 8,562,044 B2
(45) Date of Patent: Oct. 22, 2013

(54) TOOL TO LIFT BARBECUE GRILL

(76) Inventor: Ronald K. Mowry, Boise, ID (US)

( * ) Notice: Subject to any disclaimer, the term of this patent is extended or adjusted under 35 U.S.C. 154(b) by 0 days.

(21) Appl. No.: 13/461,474

(22) Filed: May 1, 2012

(65) Prior Publication Data
US 2013/0111707 A1 May 9, 2013

Related U.S. Application Data

(60) Provisional application No. 61/481,412, filed on May 2, 2011.

(51) Int. Cl.
*F24B 15/00* (2006.01)
(52) U.S. Cl.
USPC .................................. 294/9; 294/12
(58) Field of Classification Search
USPC ......... 294/9–12, 14, 24, 26, 27.1; 7/110, 112; D7/688–690, 669
See application file for complete search history.

(56) References Cited

U.S. PATENT DOCUMENTS

| | | | |
|---|---|---|---|
| 1,360,359 A * | 11/1920 | Beaudet | 294/2 |
| 4,222,599 A * | 9/1980 | Gale et al. | 294/12 |
| 4,482,181 A | 11/1984 | Shepherd | |
| 4,601,505 A * | 7/1986 | Chilton | 294/26 |
| D312,375 S | 11/1990 | Hessler | |
| D341,065 S * | 11/1993 | Martner | D7/690 |
| 5,314,220 A * | 5/1994 | Clement | 294/10 |
| 6,000,739 A | 12/1999 | Zemit et al. | |
| 6,247,739 B1 * | 6/2001 | Lyon | 294/159 |
| D604,122 S | 11/2009 | Borovicka et al. | |

* cited by examiner

*Primary Examiner* — Stephen Vu
(74) *Attorney, Agent, or Firm* — Pedersen and Company, PLLC; Ken J. Pedersen; Barbara S. Pedersen

(57) ABSTRACT

A simple tool for lifting a barbecue grill is described—the grill lifter tool has a handle near its top end and a downwardly depending rod from near its center. The downwardly depending rod terminates near its bottom at a horizontal rod. The horizontal rod is thin enough to fit down between and below the space between adjacent grill bars. Near the top of the downwardly depending rod there is a first washer around and welded to the rod. Near the bottom of the downwardly depending rod, there is a second washer movably resting on the top of the horizontal rod, and held in place by a partially compressed spring constrained between the first top washer and the second bottom washer. The second bottom washer is large enough to not fit down into the space between the grill bars.

5 Claims, 5 Drawing Sheets

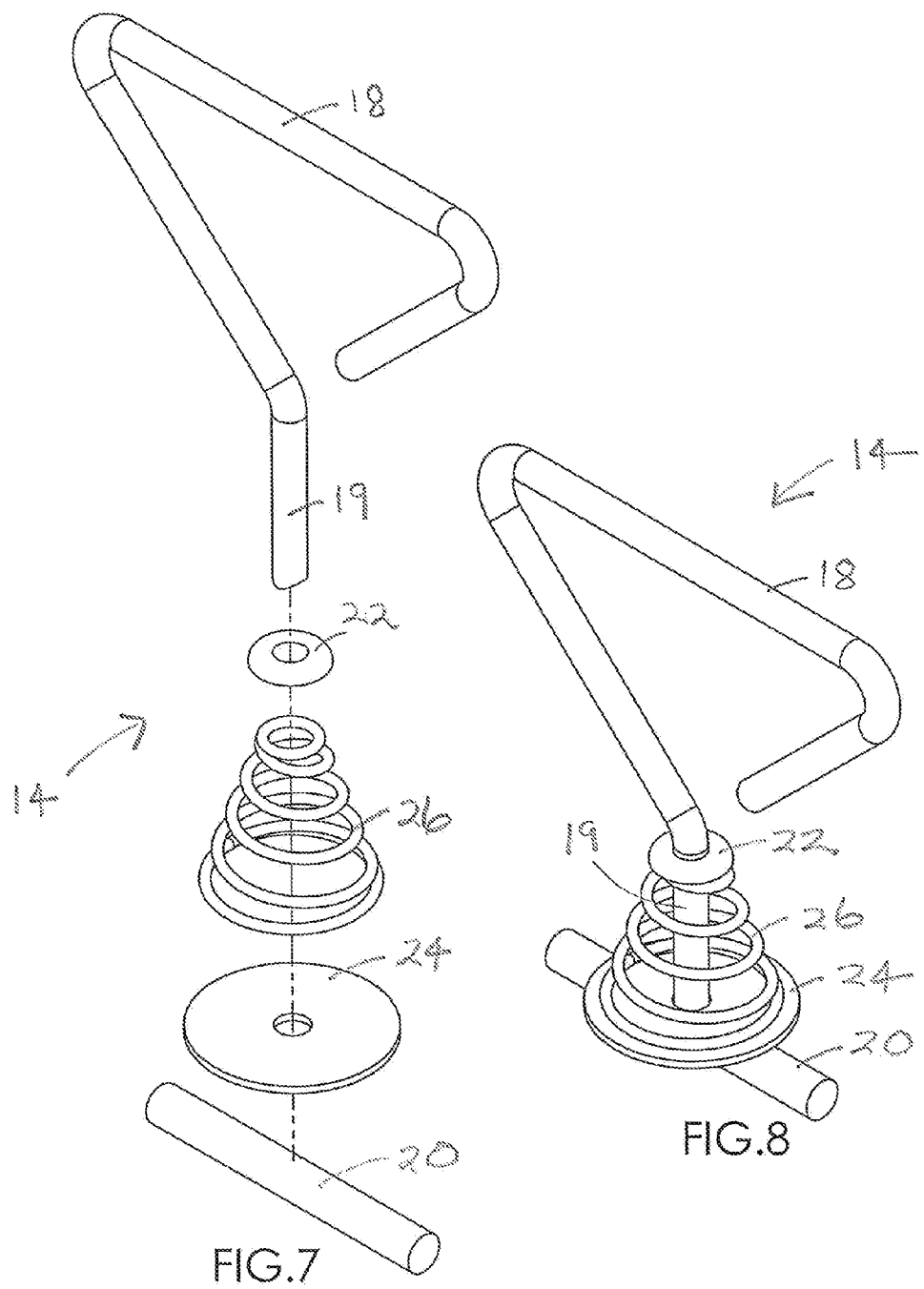

TOOL TO LIFT BARBECUE GRILL

This application claims priority of my prior, provisional U.S. patent application, Ser. No. 61/481,412, filed on May 2, 2011, entitled "TOOL TO LIFT HOT GRILL," which is incorporated herein by reference.

BACKGROUND OF THE DISCLOSED TECHNOLOGY

1. Field of the Disclosed Technology

This invention relates generally to cooking, and more specifically to a tool for manually lifting a hot or dirty barbecue grill without burning or soiling the chef's hands.

2. Related Art

U.S. Pat. No. 4,482,181 (Shepherd) discloses a grill lifter having an insulated, horizontal handle, and two similar, downwardly first depending, then horizontally second extending, fixed hook prongs. The prongs interfit with the grill so that it may be lifted by the chef.

U.S. Design Pat. No. D312,375 (Hessler) discloses a fixed three-pronged barbecue grill-lifting tool.

U.S. Pat. No. 6,000,739 (Zemit et al.) discloses a fixed, single-pronged barbecue grill lifting tool.

U.S. Design Pat. No. D604,122 (Borovicka et al.) discloses a barbecue grill lifter with an insulated, horizontal handle, and a first outer, downwardly depending hollow shaft which terminates at a horizontal, rectangular grid. This grill lifter also has a second inner, downwardly depending solid shaft within the first hollow shaft, which second shaft terminates at a horizontal, cylindrical rod. The second, inner shaft is movable relative to the first, outer shaft, and the cylindrical rod is movable relative the rectangular grid, by squeezing the handle against the bias of a spring to open a space between the rod and the grid for engaging the grill.

SUMMARY OF DISCLOSED TECHNOLOGY

What is disclosed is a simple tool for lifting a barbecue grill. The grill lifter tool is easily fastened to, and removed from, the grill. One lifter tool may be enough to lift the grill. However, a pair of tools, spaced equally apart from the center of gravity of the grill, are preferred.

The grill lifter tool has a handle near its top end and a downwardly depending rod from near its center. The downwardly depending rod is about 2-4 inches long, and about ¼-⅓ inch in diameter. The downwardly depending rod terminates near its bottom at a horizontal rod. The horizontal rod is also about 2-4 inches long, and about ¼-⅓ inch in diameter. The horizontal rod is thin enough to fit down and below the space between adjacent grill bars.

Near the top of the downwardly depending rod, there is a first horizontal washer around and welded to the rod. Near the bottom of the downwardly depending rod, there is a second horizontal washer movably resting on the top of the horizontal rod, and held in place by a partially compressed spring constrained between the first top washer and the second bottom washer. The second bottom washer is large enough to not fit down into the space between the grill bars. In fact, the second bottom washer preferably is large enough to extend over the tops of several adjacent grill bars.

In use, the grill lifter tool is positioned above the grill, and turned so that the horizontal rod is parallel to the space between two adjacent grill bars. Then the handle is pushed down so that the horizontal rod passes down between the grill bars, and the bottom of the second bottom washer rests on the tops of several adjacent grill bars. Then, the handle is pushed further down so that the spring further compresses, and the horizontal rod passes below the two adjacent grill bars. Then, the handle is turned 90° so that the horizontal rod is perpendicular to the grill bars and beneath them. Then, upon release of the handle, the spring decompresses, and the horizontal rod rises up to engage securely against the bottoms of several adjacent grill bars, thereby fastening the grill lifter tool to the grill so that the grill may be lifted by raising the lifter tool's handle.

BRIEF DESCRIPTION OF THE DRAWINGS

FIG. 7 is an exploded, top perspective view of a subject grill lifter tool.

FIG. 8 is an assembled view of the view depicted in FIG. 7.

DETAILED DESCRIPTION OF ONE EMBODIMENT OF THE DISCLOSED TECHNOLOGY

Referring to the Figures, there is shown one, but not the only, embodiment of the disclosed technology.

Figure 1:
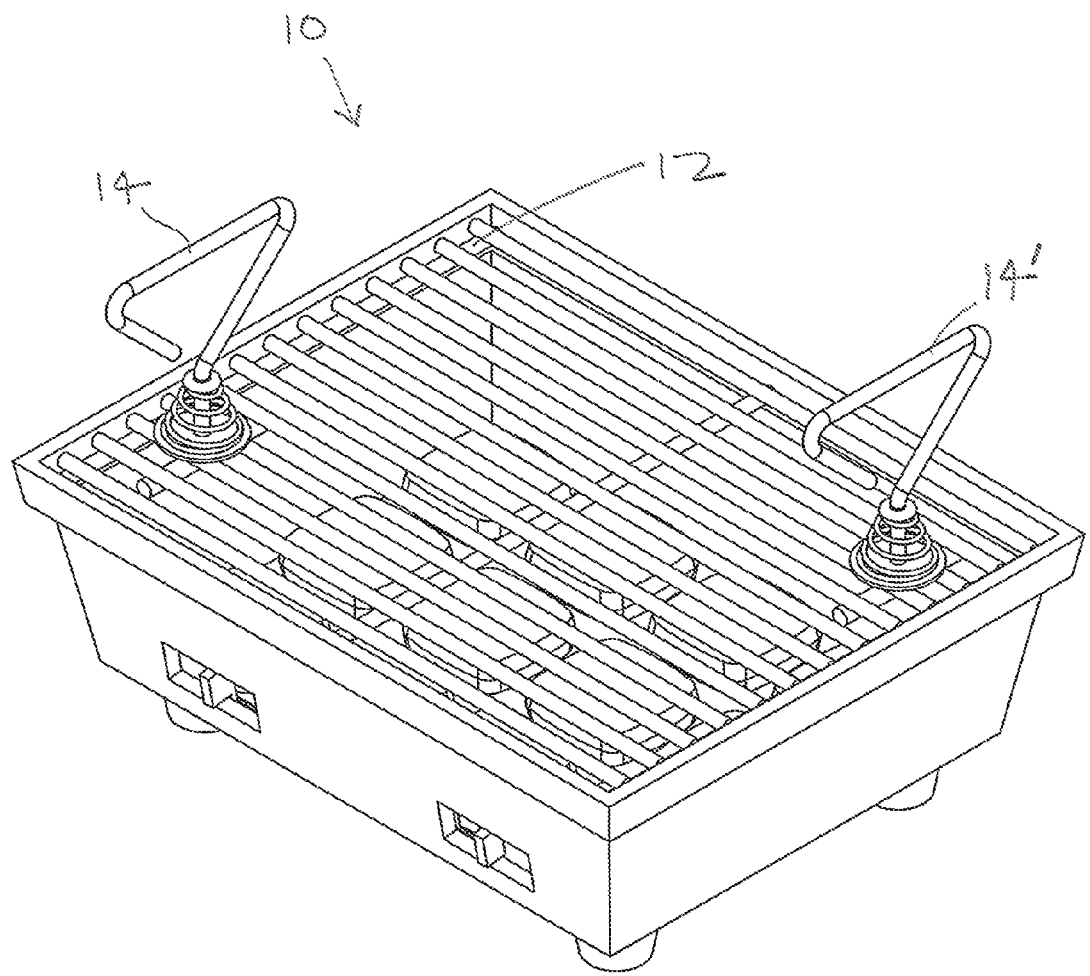
FIG. 1 is a top perspective view of two of the subject grill lifter tools temporarily fastened to a barbecue grill.

FIG. 1 depicts barbecue 10 with grill 12 and grill lifter tools 14 and 14'.

Figure 2:
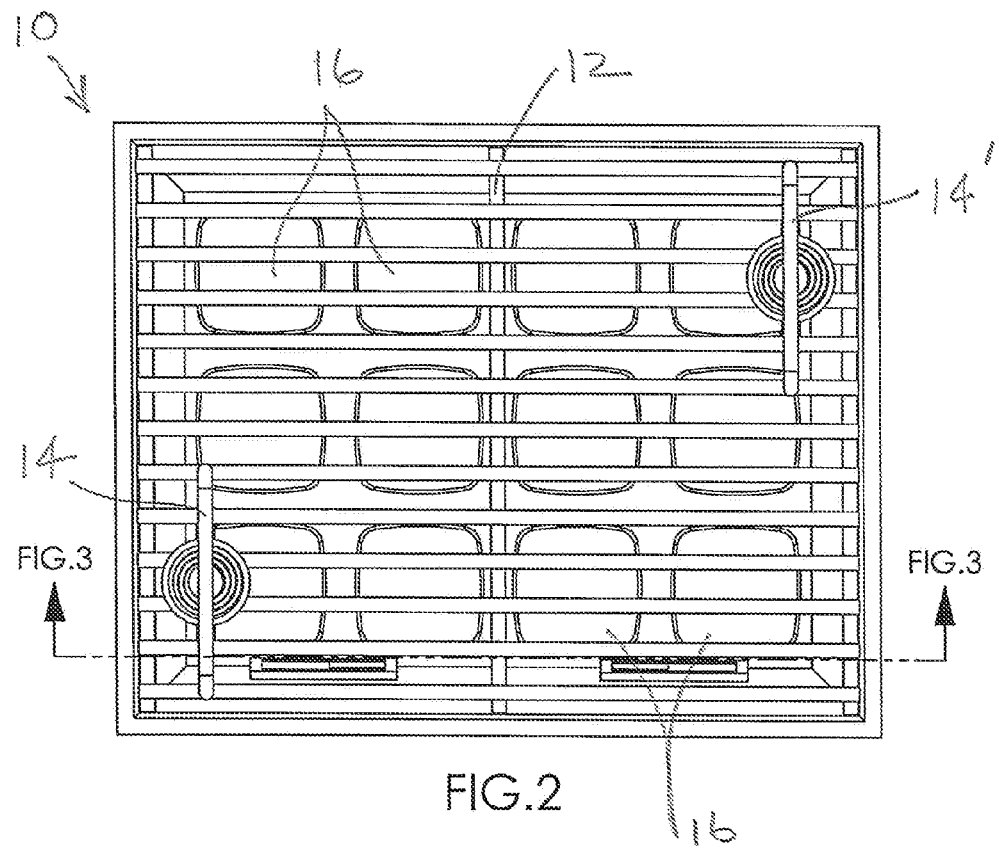
FIG. 2 is a top view of the view depicted in FIG. 1.

FIG. 2 depicts the same items as FIG. 1, but depicts the charcoal briquettes 16 in barbecue 10 more clearly.

Figure 3:
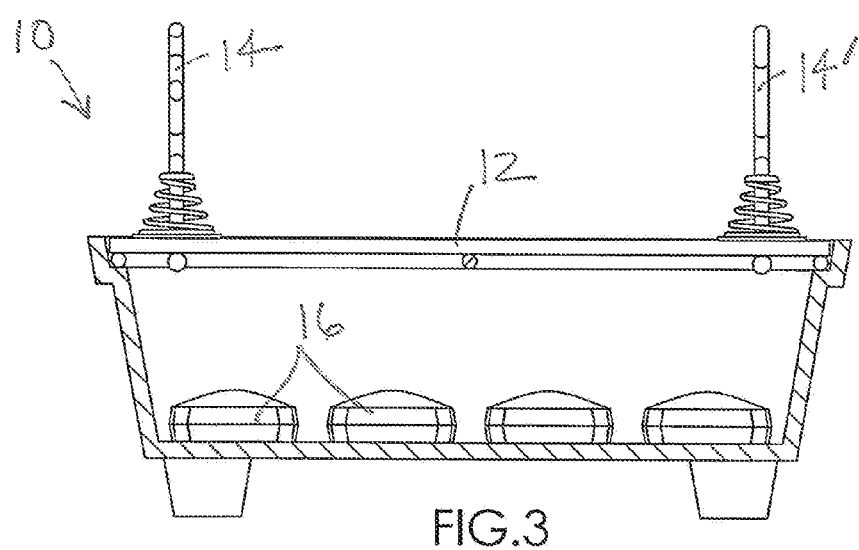
FIG. 3 is a side, cross-sectional view along line 3-3 in FIG. 2.

FIG. 3 depicts the same elements depicted in FIGS. 1 and 2 in a side, cross-sectional view.

Figure 4:
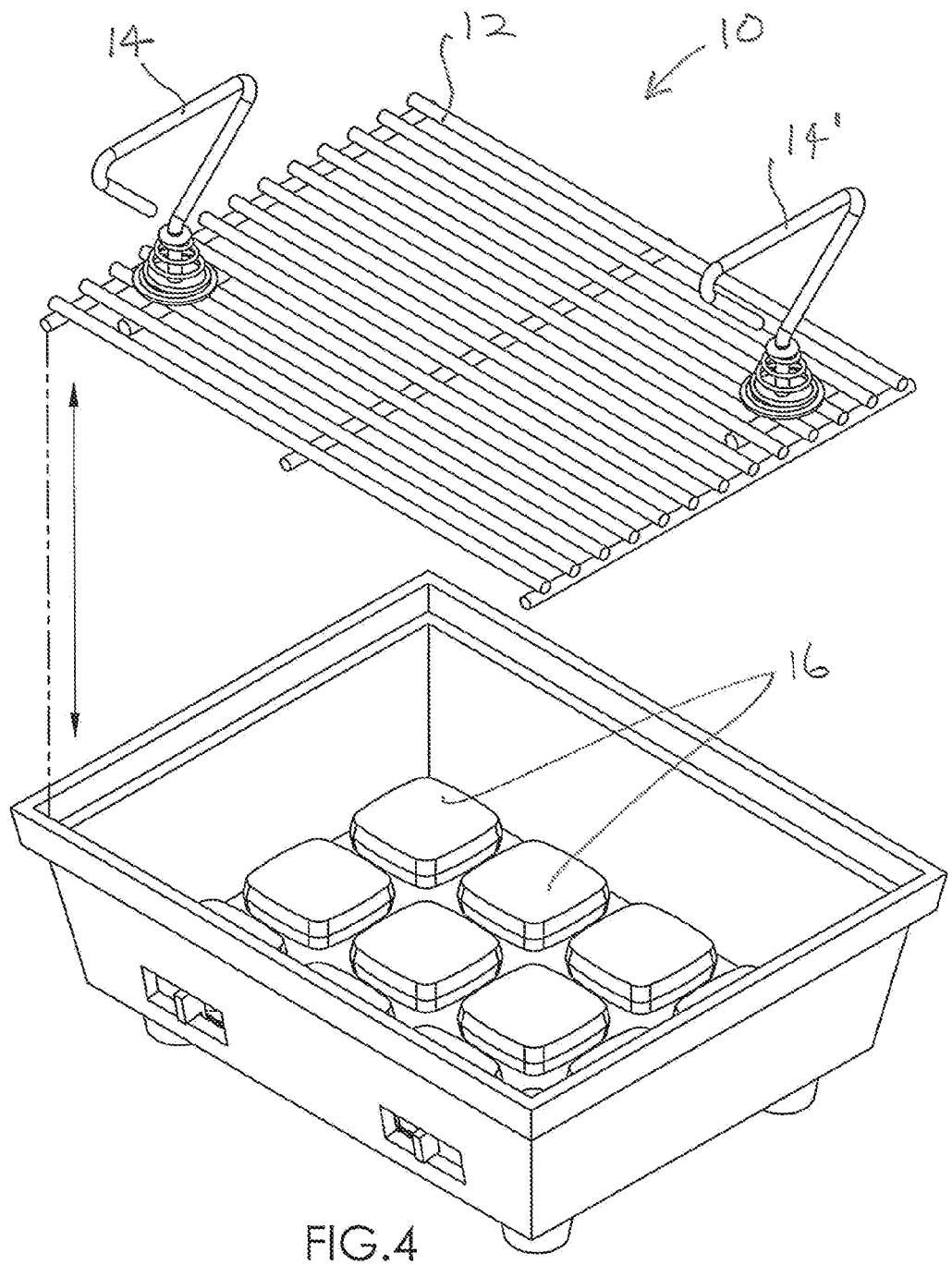
FIG. 4 is a partially exploded view of the view depicted in FIG. 1.

FIG. 4 depicts the same elements depicted in FIGS. 1-3, but shows schematically grill 12 being lifted by tools 14 and 14'.

Figure 5:
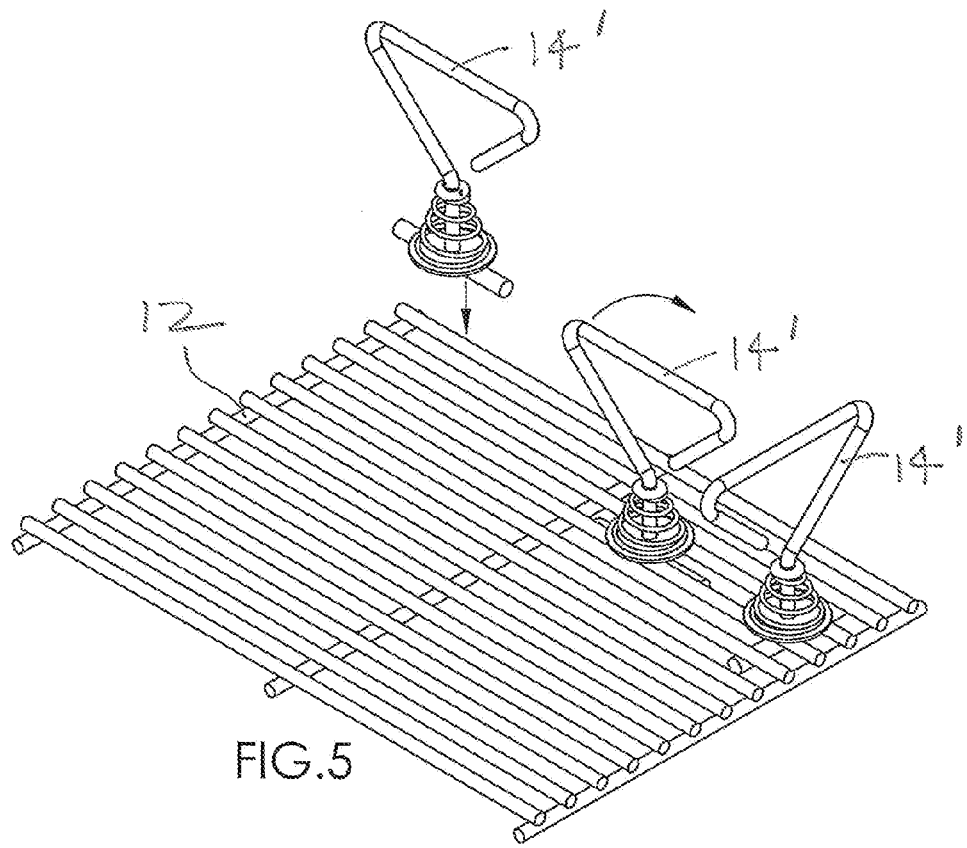
FIG. 5 is a schematic, top perspective view of the sequence for a subject grill lifter tool being fastened to a grill.

FIG. 5 depicts schematically in a perspective view the sequence of grill lifter tool 14' being fastened to grill 12.

Figure 6:
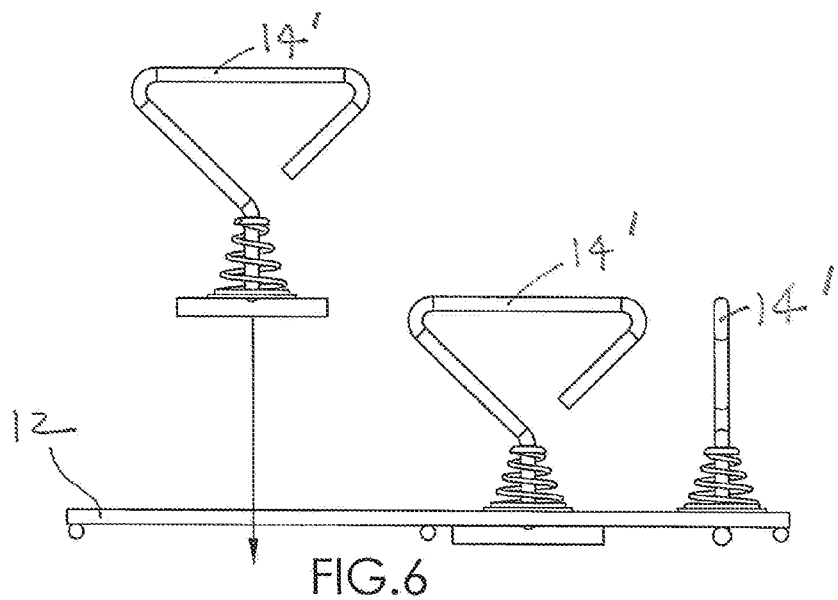
FIG. 6 is a side view of the view depicted in FIG. 5.

FIG. 6 depicts the sequence depicted in FIG. 5, but in a side view.

FIG. 7 depicts an exploded view of the component parts of grill lifter tool 14. Tool 14 has handle 18, in this embodiment fashioned from an 11-½ inch long piece of 0.243 inch diameter solid round stainless steel rod. Handle 18 is made by bending this rod. The top of the handle 18 is open at its proximal end, and the distal end, or bottom, of handle 18 transitions into downwardly depending rod 19 from near the center of handle 18. Welded perpendicularly to the bottom of downwardly depending rod 19 is horizontal rod 20, in this case a 2-½ inch long piece of straight, 5/16 inch diameter solid round stainless steel rod.

Near the top of downwardly depending rod 19 is first horizontal upper washer 22, in this case a downwardly facing cupped about ¼ inch inner diameter and about 9/16 inch outer diameter (nominally, "¾" inch) stainless steel finish washer. Beneath first upper washer 22, and above horizontal rod 20, is second horizontal lower washer 24, in this case a flat 9/32 inch inner diameter and 1-½ inch outer diameter stainless steel fender washer. Between first, upper washer 22 and second, lower washer 24 is spring 26, in this case a ½ inch top diameter, 1-¼ inch bottom diameter conical coiled compression spring of 0.080 inch diameter stainless steel wire, open at the top and the bottom. Preferably, the top and bottom ends of the spring wire are flattened by grinding in order to maximize friction between the spring and the washers.

To make the assembled grill lifter tool depicted in FIG. 8, first the round rod for handle 18 is bent into an open triangle shape as shown, with horizontal handle 18 being about 3-½ inches long, and downwardly extending rod 19 being about 1-½ inches long. Second, horizontal rod 20 is centered and welded perpendicularly to the bottom of downwardly depending rod 19. Preferably rod 19 should depend from about the geometric and weight center of handle 18. Third, from the open end of handle 18, second, lower washer 24, spring 26, and first, upper washer 22 are slid, in that order, through their central opening and down onto the top of horizontal rod 20. Fourth, sufficient axial downwardly directed pressure is applied to the top of first, upper washer 22 to partially compress spring 26, and, with the spring 26 partially compressed, first, upper washer 22 is welded annularly around and to the downwardly depending rod 19 near the top of the rod 19. This way, the continued compression of spring 26 restrains the spring by sideways friction on the bottom surface of first, upper washer 22, and the top surface of second, lower washer 24. Also this way, when the bottom surface of second, lower washer 24 receives sufficient upwardly directed pressure to overcome the downward pressure of partially compressed spring 26, second lower washer 24 may be moved upwardly relative to horizontal rod 20, enabling a gap to be created between the top of horizontal rod 20, and the bottom surface of second, lower washer 24. It is this gap which is ingeniously used to temporarily fasten grill lifter tool 14 to grill 12.

To use assembled grill lifter 14, first horizontal rod 20 is placed parallel in the space between two adjacent grill bars as depicted in FIGS. 5 and 6. Then, downward pressure is applied to handle 18 which puts upward pressure on the bottom surface of second, lower washer 24, sufficient to overcome the downward pressure from partially compressed spring 26, and creates the gap discussed above between the top of horizontal rod 20, and the bottom surface of second, lower washer 24. With this gap created, it is easy to turn handle 18 90° so that horizontal rod 20 is turned 90° from parallel to perpendicular and beneath the adjacent grill bars. This way, when the downward pressure on handle 18 is released, the gap created closes due to the downward pressure of spring 26, and several of the adjacent grill bars are squeezed between the top of horizontal rod 20 on the bottom of grill 12, and the bottom of second, lower washer 24 on the top of grill 12. Also this way, grill lifter tool 14 is securely, but temporarily, fastened to grill 12 for lifting grill 12.

To remove lifter tool 14, this fastening procedure discussed immediately above is reversed in order.

Although this disclosed technology has been described above with reference to particular means, materials, and embodiments, it is to be understood that the disclosed technology is not limited to these disclosed particulars, but extends instead to all equivalents within the scope of the following claims.

I claim:

1. A barbecue grill lifter tool, comprising:
a generally horizontal handle with two ends and a center between them for grasping by a hand of a user;
a generally vertically downwardly depending rod connected to the handle said rod having a top end and a bottom end;
said downwardly depending rod being connected near its bottom end to a horizontal rod;
a first, upper, generally horizontal washer being disposed around and secured to the downwardly depending rod near the top end of the rod, the first upper washer being a finish washer with its cup open downwardly;
a second, bottom, generally horizontal washer being disposed around, but moveable vertically relative to, the downwardly depending rod, said second, bottom washer being a flat fender washer, and movably resting at its bottom surface on the top of said horizontal rod near the bottom end of said downwardly depending rod; and,
a generally vertically oriented spring being disposed near the downwardly depending rod, said spring being constrained between said first, upper washer and said second, bottom washer.

2. The grill lifter tool of claim 1 wherein the handle and the downwardly depending rod are made by bending one piece of rod stock.

3. The grill lifter tool of claim 1 wherein the downwardly depending rod is located at about the center of the handle.

4. The grill lifter tool of claim 1 wherein the spring is a coiled, conical compression spring disposed around the downwardly depending rod.

5. The grill lifter of claim 1 wherein the spring is constrained by friction with the second, bottom washer.

\* \* \* \* \*